(12) United States Patent
Bellon

(10) Patent No.: US 6,513,793 B2
(45) Date of Patent: Feb. 4, 2003

(54) ELECTRIC FENCE

(76) Inventor: Jean-Michel Bellon, Chemin de la Lie F-01480 Messimy, sur Saone (FR)

(*) Notice: Subject to any disclaimer, the term of this patent is extended or adjusted under 35 U.S.C. 154(b) by 107 days.

(21) Appl. No.: 09/754,551

(22) Filed: Jan. 4, 2001

(65) Prior Publication Data

US 2001/0015426 A1 Aug. 23, 2001

(30) Foreign Application Priority Data

Jan. 4, 2000 (FR) .............................................. 00 00027

(51) Int. Cl.⁷ ................................................ A01K 3/00
(52) U.S. Cl. ........................................ 256/10; 119/908
(58) Field of Search ............................ 256/10, 1, 6, 32, 256/46, 47, 48, 54; 119/220, 710, 721, 518, DIG. 908

(56) References Cited

U.S. PATENT DOCUMENTS

| | | |
|---|---|---|
| 4,162,783 A | 7/1979 | Crist, Jr. |
| 4,861,645 A * | 8/1989 | Standing ..................... 428/196 |
| 5,036,166 A * | 7/1991 | Monopoli ................. 174/128.1 |
| 5,203,542 A | 4/1993 | Coley et al. |
| 5,771,147 A * | 6/1998 | Erksson et al. ................ 256/10 |
| 6,341,550 B1 * | 1/2002 | White .......................... 256/10 |

FOREIGN PATENT DOCUMENTS

| | | |
|---|---|---|
| EP | 0 256 841 A2 | 2/1988 |
| FR | 2474276 | 7/1981 |
| FR | 2 625 599 | 7/1989 |
| FR | 2 655 814 | 6/1991 |
| GB | 1 585 602 | 5/1977 |

* cited by examiner

*Primary Examiner*—Lynne H. Browne
*Assistant Examiner*—Kenneth Thompson
(74) *Attorney, Agent, or Firm*—Heslin Rothenberg Farley & Mesiti, P.C.; Jeff Rothenberg; Victor A. Cardona

(57) ABSTRACT

This electric fence comprises at least one electrically conducting metal wire (1) with good mechanical properties, associated with a support, and further incorporates at least one other electrically conducting wire (4) with good electrical conductivity, sheathed with an insulating material (5) over its entire length except for zones distributed at more or less regular intervals where the said conducting wire (4) is in direct or indirect contact with the said conducting metal wire or wires (1) with good mechanical properties.

20 Claims, 2 Drawing Sheets

ELECTRIC FENCE

CROSS-REFERENCE TO RELATED APPLICATION

This application claims the priority of French patent application no. 00.00027, filed on Jan. 4, 2000.

The invention relates to an electric fence more particularly intended for enclosing animals.

Increasingly, such fences, employing fencing ropes or tapes, allow users to keep the animals far more safely than other fences, such as those made of barbed wire in particular.

Specifically, because of the high voltage carried in the electrical conductors, most of the risks of injury to the animals are limited, while at the same time forcing the animals to observe defined limits. In fact, the animals very soon learn to distinguish between an electric fence and a non-electrified fence.

Thus, a protected perimeter can be defined precisely, as the users choose, taking account of details specific to each.

However, changes in the world of agriculture are dictating the use of increasingly large plots and, as a side issue of this, increasingly long perimeters and thus increasingly long distances that need to be electrified.

Now, it is necessary for such distances to take account of the voltage available at any point along the fence, including the points farthest from the source of power, so that the fence maintains its repellent qualities so that it maintains its reliability.

To this end, electrification devices have undergone a great deal of development, because it has thus become possible to increase their power while at the same time improving their reliability. In fact, electrification devices delivering a voltage of 10 000 volts or even more are now available on the market. Their reliability is also optimized through the use of built-in electronics in such devices.

The limiting factor therefore consists of the ropes and tapes for electric fences, which run into various problems.

Thus, in the case of fences of long length, these have simultaneously to have high mechanical strength, high electrical conductivity and, furthermore, a relatively long life.

The high electrical conductivity is needed for fences of long length, for which there is a desire to have, at any point thereon, even at the ends furthest from the power source, the nominal voltage delivered by the latter or a high enough value appropriate to each animal (for example cows: 2500 V, horses: 1500 V, sheep: 4000 V). Thus, with materials with a relatively high electrical resistivity, the current pulses end up being insufficient to give the said fence its dissuasive and repellent nature with respect to the animals enclosed.

Copper is particularly suitable for fulfilling this requirement. Unfortunately, it is far too weak and too quickly attacked by corrosion, which precludes its use by itself.

In fact, it is sometimes provided with protection, such as a coating of zinc, nickel or tin, and even sometimes silver, for example. However, corrosion sooner or later occurs.

This corrosion may also be accelerated by external factors such as contamination, salt mist, pesticides and other chemical products used in agriculture.

Aluminium for its part has a higher electrical resistivity than copper, but one which is, however, entirely adequate for the envisaged application.

However, these two metals have mechanical properties, particularly in terms of breaking stress and elongation, which are entirely incompatible with application to electric fences, mechanical strength being one of the requirements needed of the electric wires used in the fence. In fact it should be remembered that these fences have to undergo numerous modifications as a result of the various possible configurations of pastures or lots, which lead to the wires quite frequently being folded up or rewound, thereby causing localized mechanical stresses in one direction then the other, quite frequently leading to the breakage of the metal conductors, these breakages usually being undetectable when these metal elements are built into a synthetic support.

These breakages give rise to local impairment or even complete annihilation of the conduction of electricity at certain points in the fence, thus altering its effectiveness for the worst.

It has therefore been proposed that use be made of conducting metal wires made of stainless steel, given the mechanical properties of this material, and particularly its elongation.

Unfortunately, stainless steel has a relatively high electrical resistivity, in fact adversely affecting the good electrical conductivity and making it incompatible with use in large-sized fences unless several electrification devices are used, which would then considerably increase the cost of such an electric fence.

The user is therefore faced with a choice between good electrical conductivity and a service life which is both sufficient and economically viable in the environment in which electric conductors have to be placed.

Various solutions have been proposed with a view to alleviating these drawbacks.

One of them, for example described in document EP-A-0 256 841, proposes associating two types of conductor within one and the same electric fence, these being a conductor with good mechanical properties and a conductor with good electrical conductivity.

In that way, when the conductor with good electrical conductivity breaks locally, and bearing in mind the fact that it is inserted in a textile support in the form of a braid, woven or twist, the wires with good mechanical properties take over conducting electricity, which makes it possible to ensure continuity of the conduction of electricity to another metal element which is a good conductor of electricity.

However, it is to be noted that this result is possible only with a braided support, otherwise there is not any contact between the various metal conductors and the takeover cannot be achieved effectively.

Furthermore, even with such a configuration, conduction is not satisfactory (see, for example, in document FR-A-2 625 599, where an electric fence has a support within which a conductor made of stainless steel and a conductor made of copper are braided side by side, thus providing several points of contact between these conductors: conduction is not satisfactory given the relative mobility of the wires with respect to each other, seeing as they are mounted like warp filaments.

Furthermore, the conductor of lower electrical conductivity affects the overall conduction of electricity, tending towards the same result as an electric fence incorporating a metal conductor of the stainless steel type.

Furthermore, the conducting element of good electrical conductivity, and in this instance the copper or the aluminium, is attacked by corrosion over time, leading it to break at several points affecting the electrical conductivity needed to electrify long distances because, in this case, only the stainless steel that makes up the conductor with good mechanical properties then fulfils this function, but with a certain drop in the desired efficiency.

It has also been proposed, for example in document FR-A-2 655 814, that use be made of conducting wires based on a binary copper/cadmium metal alloy coated at its periphery with a layer of nickel. While, unarguably, the use of such conducting wires makes it possible to achieve a certain efficiency when applied to electrification over long distances it does, however, prove to be relatively expensive given the alloy used.

The object of the invention is therefore to propose an electric fence capable both of being used over long distances and to be so without affecting the electrical conductivity at any point whatsoever on the said fence and also capable of being accessible at reasonable cost while at the same time having mechanical properties capable of allowing it to be reused numerous times.

This electric fence comprises at least one electrically conducting metal wire with good mechanical properties associated with a support. It also incorporates another electrically conducting wire with good electrical conductivity, sheathed with an insulating material over its entire length except for zones distributed at more or less regular intervals where the said conducting wire is in direct or indirect contact with the said conducting metal wire with good mechanical properties.

In other words, seeing as the sheathed wire is a wire which is a good conductor of electricity, the invention consists in employing an assembly consisting of at least one metal wire that is a good conductor of electricity and metal wires with good mechanical properties, and in which the wire which is a good conductor of electricity is sheathed over most of its length so as to protect it from attack by corrosion inherent to the external surroundings, or damage likely to be caused during the successive unfoldings and refoldings of the fence.

According to one embodiment of the invention, the support consists of the sheathed wire thus constituting a strand or rope with the metal wire with good mechanical properties.

According to another embodiment of the invention, the support consists of a woven, braided or knitted tape made of an insulating, advantageously synthetic, material, the said sheathed conductor constituting one of the warp filaments.

Contact between the sheath-free zones of the said sheathed conductor and the metal wire or wires with good mechanical properties is by means of metal plates gripping the various conductors at the sheath-free zone of the said conductor with good electrical conductivity, for example at each end.

Advantageously, the sheath of the sheathed conductor is anti-UV treated.

The way in which the invention can be achieved and the advantages which stem therefrom will become better apparent from the exemplary embodiments which follow, which are given by way of indicative and nonlimiting example with the support of the appended figures.

Figure 1:
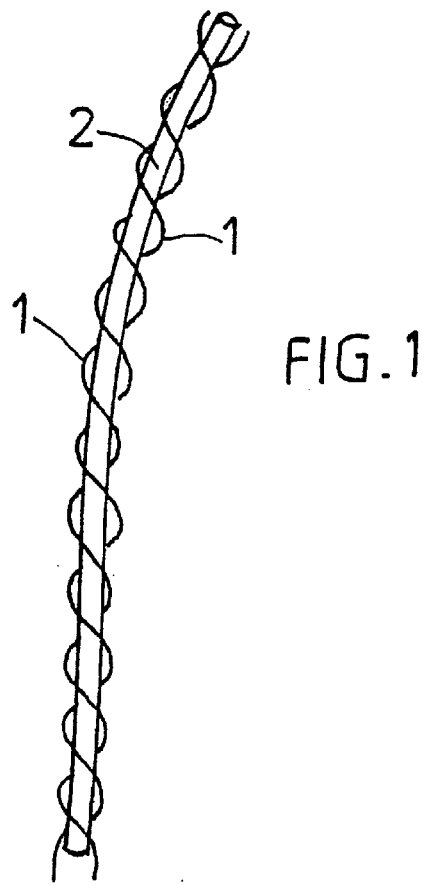
FIG. 1 is a schematic view depicting a strand according to the invention.

FIG. 1 depicts a strand or rope according to the present invention. This strand fundamentally consists of the metal wires (1) made of, for example stainless steel and in fact exhibiting good mechanical properties, particularly in terms of breaking stress and elongation. As would be evident to those skilled in the art, the metal wires (1) with good mechanical properties might be made of a variety of materials and might have a tensile strength in the range of about 30 $Kg/mm^2$ to about 80 $Kg/mm^2$, for example. These stainless steel metal wires surround a metal wire (2) sheathed in plastic. This metal wire (2) advantageously is made of copper or aluminium which, as is known, has good electrical conductivity. Also, this metal wire (2) could be made of a variety of other materials which, for example, might have a resistivity of up to about 0.15 $ohm/mm^2/m$. Over its entire length it has a plastic sheath interrupted, for example at the zones where the strand thus formed is fixed to the electric insulators, or at each of the connections between two consecutive reels. At this point, the bared zones of the copper wire therefore come into contact with the stainless steel wires, thus passing on the electrical conduction and raising the voltage available at the said stainless steel wires to more or less the nominal level of voltage available at the output of the electrification device to the output terminal of which the strand is connected, give or take the voltage drop due to its own resistance.

In this particular instance, the sheathed conductor (2) also acts as a support for the electric fence.

Figure 2:
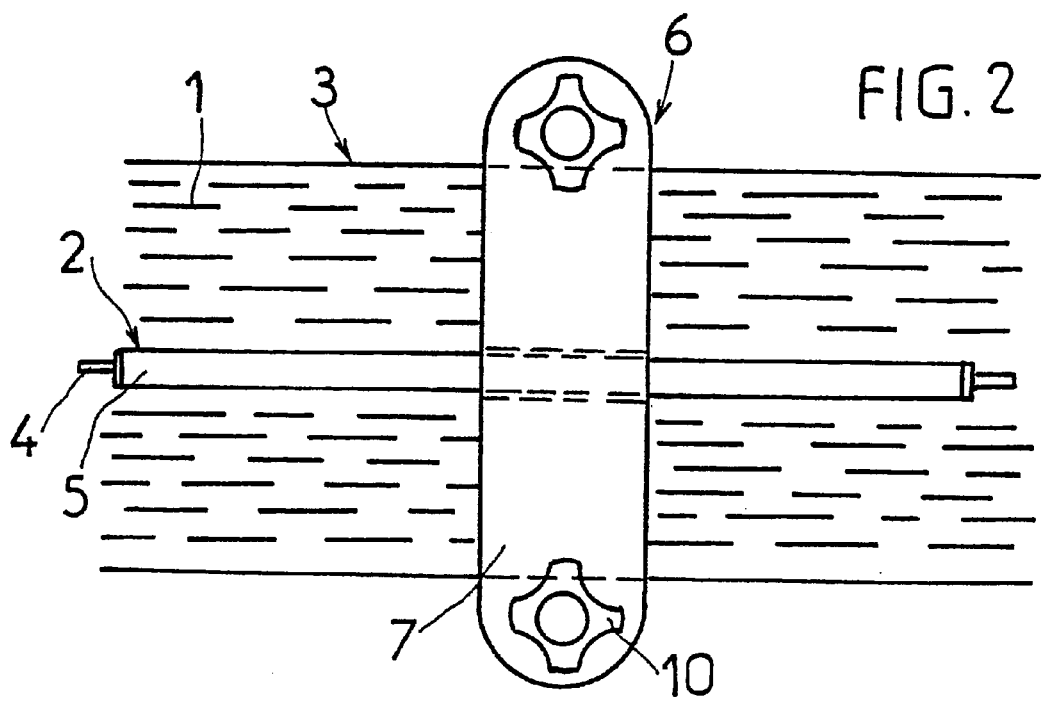
FIG. 2 is a schematic depiction depicting a tape according to another embodiment of the invention.
Figure 3:
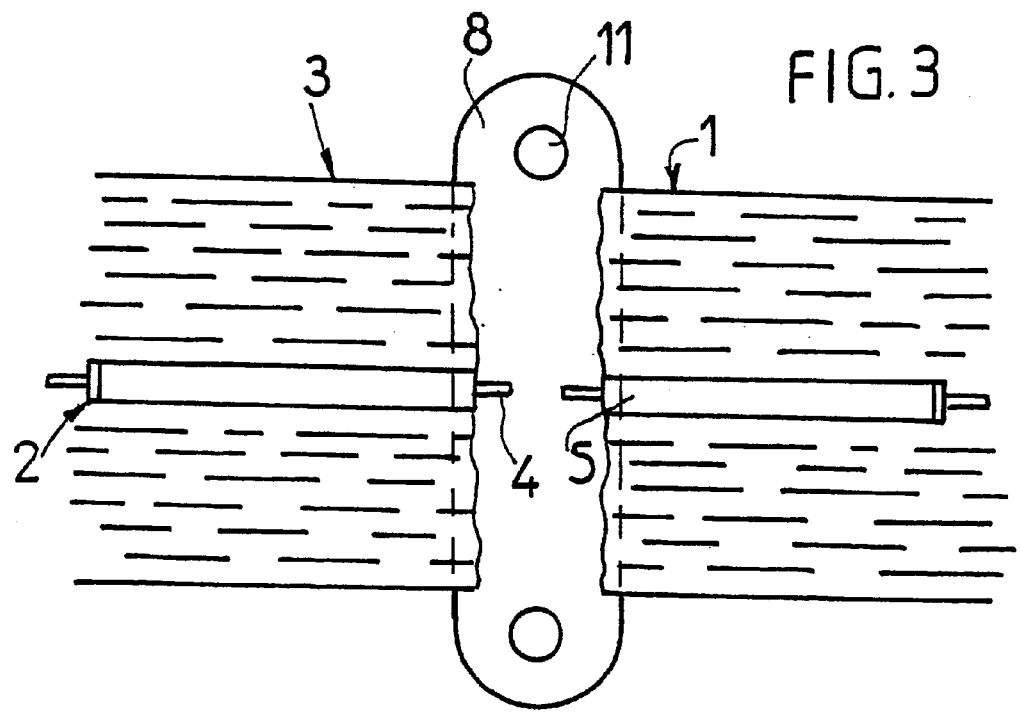
FIG. 3 is a view similar to FIG. 2, in a partially exploded view.

In the embodiment depicted in conjunction with FIGS. 2 and 3, the electric fence is in the form of a tape (3) based on woven, braided or knitted plastic, and therefore not electrically conducting, filaments.

This tape (3) incorporates, as warp filaments, metal conducting elements (1) made of stainless steel and therefore apparent at more or less regular intervals on each of the surfaces of the said tape.

Advantageously, these tapes are dyed in the mass, in a highly visible colour, so as to attract the attention of the animals intended to be enclosed using the said fence.

This tape also contains a copper wire (4) which is sheathed over most of its length by a sheath (5) and stitched to the tape. In an alternative version, this wire (2) may constitute one of the warp filaments of the tape (3).

At more or less regular intervals, the copper wire (4) is bared, for example where the tape is fixed to the insulators, or at connections between two reels.

In these regions, metal plates (6) trap the tape and the bared parts of the conductor (4) so as thus to relay the electricity at the metal conductors (1). Thus, at regular intervals, and bearing in mind the low electrical resistivity of the copper of which the conducting element (4) is made, the voltage within it remains practically constant and more or less corresponds to that delivered by the electrification device, which means that it is applied to the conductors made of stainless steel at regular intervals, so that a practically nominal voltage will be available at all points along the tape.

The electric fence thus produced therefore has, regardless of its position, a high voltage as close as possible to the voltage delivered by the electrification device, as a result of the relaying performed by the sheathed metal conductor (4).

Figure 4:
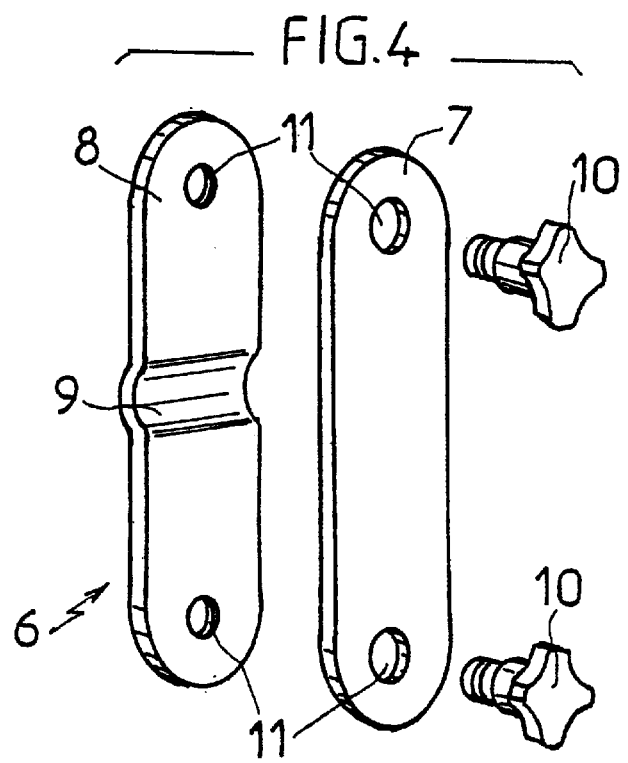
FIG. 4 is a schematic depiction of a metal plate providing conduction between the sheathed element and the conducting wires with good mechanical properties.

FIG. 4 depicts a metal plate (6) according to the embodiment of the invention.

Typically, this plate (6) is in fact made of two plates (7) and (8), one (8) of them having a semicylindrical deformation (9) capable of housing the sheathed wire (2).

These two plates (7) and (8) are joined together firmly by means of nuts (10) screwed into threaded orifices (11) provided for that purpose.

There is thus obtained an electric fence of low cost price with electrical properties compatible with the envisaged applications, including for long-distance fences, without the risk of corrosion and allowing reuse many times.

What is claimed is:

1. Electric fence comprising at least one electrically conducting metal wire (1) with good mechanical properties having a range of tensile strength of about 30 Kg/mm$^2$ to about 80 Kg/mm$^2$, associated with a support, characterized in that it further incorporates at least one other electrically conducting wire (4) with good electrical conductivity having a resistivity of up to about 0.15 ohm/mm$^2$/m, sheathed with an insulating material (5) over its entire length except for zones distributed at more or less regular intervals where the said conducting wire (4) is in direct or indirect contact with the said conducting metal wire or wires (1) with good mechanical properties.

2. Electric fence according to claim 1, characterized in that the metal wire or wires (1) with good mechanical properties, particularly in terms of breaking stress and elongation, are made of stainless steel.

3. Electric fence according to claim 1, characterized in that the metal conducting wire or wires (4) with good electrical conductivity are made of copper or aluminum.

4. Electric fence according to claim 1, characterized in that the support consists of the sheathed wire (2) thereby forming, with the metal wire (1) with good mechanical properties, a strand or a rope.

5. Electric fence according to claim 1, characterized in that the support consists of a woven, braided or knitted tape (3) made of an insulating, advantageously synthetic, material.

6. Electric fence according to claim 5, characterized in that the sheathed conductor (2) constitutes one of the warp filaments of the support (3).

7. Electric fence according to claim 1, characterized in that contact between the bared zones of the said sheathed conductor (2) and the metal wire or wires (1) with good mechanical properties is by means of metal plates (6, 7, 8) clamping the various conductors at the said bared zone of the said conductor with good electrical conductivity (4).

8. Electric fence according to claim 7, characterized in that one of the plates (7, 8) has a semicylindrical housing (9) intended to house the sheathed wire (2).

9. Electric fence according to claim 1, characterized in that the sheath (5) of the sheathed conductor (4) is anti-ultra-violet treated.

10. Electric fence according to claim 2, characterized in that the metal conducting wire or wires (4) with good electrical conductivity are made of copper or aluminum.

11. Electric fence according to claim 2, characterized in that the support consists of the sheathed wire (2) thereby forming, with the metal wire (1) with good mechanical properties, a strand or a rope.

12. Electric fence according to claim 3, characterized in that the support consists of the sheathed wire (2) thereby forming, with the metal wire (1) with good mechanical properties, a strand or a rope.

13. Electric fence according to claim 10, characterized in that the support consists of the sheathed wire (2) thereby forming, with the metal wire (1) with good mechanical properties, a strand or a rope.

14. Electric fence according to claim 2, characterized in that the support consists of a woven, braided or knitted tape (3) made of an insulating, advantageously synthetic, material.

15. Electric fence according to claim 10, characterized in that the support consists of a woven, braided or knitted tape (3) made of an insulating, advantageously synthetic, material.

16. Electric fence according to claim 2, characterized in that contact between the bared zones of the said sheathed conductor (2) and the metal wire or wires (1) with good mechanical properties is by means of metal plates (6, 7, 8) clamping the various conductors at the said bared zone of the said conductor with good electrical conductivity (4).

17. Electric fence according to claim 3, characterized in that contact between the bared zones of the said sheathed conductor (2) and the metal wire or wires (1) with good mechanical properties is by means of metal plates (6, 7, 8) clamping the various conductors at the said bared zone of the said conductor with good electrical conductivity (4).

18. Electric fence according to claim 10, characterized in that contact between the bared zones of the said sheathed conductor (2) and the metal wire or wires (1) with good mechanical properties is by means of metal plates (6, 7, 8) clamping the various conductors at the said bared zone of the said conductor with good electrical conductivity (4).

19. Electric fence according to claim 4, characterized in that contact between the bared zones of the said sheathed conductor (2) and the metal wire or wires (1) with good mechanical properties is by means of metal plates (6, 7, 8) clamping the various conductors at the said bared zone of the said conductor with good electrical conductivity (4).

20. Electric fence according to claim 11, characterized in that contact between the bared zones of the said sheathed conductor (2) and the metal wire or wires (1) with good mechanical properties is by means of metal plates (6, 7, 8) clamping the various conductors at the said bared zone of the said conductor with good electrical conductivity (4).

* * * * *